Patented May 22, 1945

2,376,777

UNITED STATES PATENT OFFICE 2,376,777

PEELABLE HEAT-SEAL SHEET MATERIAL

Ernest L. Kallander, Framingham, Mass., assignor to Dennison Manufacturing Company, Framingham, Mass., a corporation of Massachusetts No Drawing. Application August 11, 1941, Serial No. 406,414

5 Claims. (Cl. 117—122)

This invention relates to adhesive coated sheet material adapted to be activated to adhesiveness by the application of heat, and its principal object is to provide a heat sealing label, tape or the like which may be readily applied and become firmly adherent to fabrics such as cotton sheeting and like surfaces, but which may be peeled off without leaving any deposit on the fabric and without injuring its finish.

Labels and like sheet material suitable for application to fabrics, prepared in accordance with prior art practices, are usually provided with an adhesive coating consisting essentially of water activatable materials such as animal glue, dextrine, etc. Such compositions are not satisfactory in that they either tend to adhere to the fabric to such an extent that they cannot be peeled or stripped off without fouling or without impairing the finish of the fabric and consequently it is necessary to wash the fabric to remove the label; or they lack the capacity to adhere to such surfaces and hence do not withstand handling of the fabric.

I have found that when rubber-wax mixtures are modified by the addition of cyclized rubber, the resulting mixture yields an adhesive composition which is resistant to cold flow, substantially free from tackiness and yet relatively elastic at ordinary temperatures, and which becomes sufficiently soft at sealing temperatures of the order of 200° to 400° F. to become firmly adherent to textile fabrics and like surfaces, but which does not become sufficiently fluid at such sealing temperatures to wet the fabric and thus prevent peeling off without leaving a deposit or injuring the surface of the fabric.

The wax may comprise any one of the normally solid waxes such as paraffin, beeswax, carnauba, ceresin, spermaceti, candelilla, japan, shellac, etc., as well as their synthetic equivalents, and mixtures thereof. The rubber may comprise any one of the natural and synthetic rubbers and their equivalents, including such naturally occurring substances as hevea rubber, balata, gutta-percha, gutta-siak, gutta-kyak, pontianiak, guayule, and certain wild rubbers and rubber-like resins and, in general, all straight-chain polymeric substances possessing the physical characteristics of the so-called elastomers.

The term cyclized rubber or cyclo-rubber is intended to include only those compositions which result from chemical transformation of the rubber molecule by cyclization, as described by Marchionna in Latex and Rubber Derivatives, volume III, page 1312, et seq. Although I have found that all commercially available cyclo-rubbers are generally satisfactory in preparing adhesive compositions of the aforesaid type, the most satisfactory cyclo-rubbers are those prepared by reacting a rubber solution with chlorostannic acid or the like, or a halide of an amphoteric metal, as described in United States Patents Nos. 2,050,209 and 2,052,391, which product is sold under the trade name Pliolite, and also those prepared by reacting rubber with certain phenolic compositions in the presence of a suitable catalyst, as described in United States Patent No. 2,158,530, which product is sold under the trade name Isolac. Another satisfactory cyclo-rubber available on the market is made by the Marbon Corporation and sold under the trade name Marbon B.

The relative proportions of wax, rubber and cyclo-rubber may be varied in accordance with the physical characteristics of the specific ingredients selected, but as a general rule the proportions should come within the following range:

|  | Range | Preferred proportions |
|---|---|---|
| Wax | 40-60 | 50 |
| Rubber | 10-30 | 25 |
| Cyclo-rubber | 20-40 | 25 |

In preparing a composition in accordance with the present invention any suitable mixing apparatus such as a Bambury, Werner & Pfleiderer or the like may be used, with or without the use of solvents, although I prefer to use mixed solvents such as naphtha and benzol, to which a small amount of alcohol may be added. If desired, suitable antioxidants and copper inhibitors may be added, as well as coloring materials such as finely ground pigments. Where, as is preferred, the adhesive composition is dissolved or dispersed in a suitable solvent in an amount which produces the desired viscosity, the resulting solution may be directly applied to the surface of a sheet of paper or like material, and to this end any conventional coating machine may be employed.

A specific example of a composition prepared in accordance with the present invention is as follows:

| | Pounds |
|---|---|
| Paraffin wax (140° F.—M. P.) | 80 |
| Crepe rubber | 40 |
| Cyclo-rubber (Pliolite #40, unmilled) | 40 |
| Benzol | 200 |
| Naphtha | 360 |
| Alcohol | 24 |
| Antioxidant and copper inhibitor | 1.5 |

The paraffin is first melted and the major portion of the benzol and all the naphtha is added; after cooling, the rubber and Pliolite are added and stirred in until dissolved. The alcohol may then be added and the antioxidant and copper inhibitor, dissolved in the remainder of the benzol, may then be added to the batch. In event it be desired to dilute the lacquer thus prepared, it may be thinned by a mixture of 2 parts naphtha to 1 part benzol.

A dry coating prepared from the foregoing composition has a softening temperature of approximately 150° F. and a sealing temperature between 200° and 400° F., within which range the coating becomes "pressure sensitive" and is readily applicable to fabrics and like surfaces. When cool, the adhesive film becomes relatively firm and non-tacky and the sheet material may be stripped or peeled off from the fabric without leaving any residue or impairing its finish.

It should be understood that the present disclosure is for the purpose of illustration and that the invention includes all modifications and equivalents which fall within the scope of the appended claims.

I claim:

1. Sheet material having a thermo-adhesive coating which is resistant to cold flow, substantially free from tackiness and relatively elastic at normal temperatures and which becomes pressure sensitive at sealing temperatures of the order of 200–400° F. without substantial loss of cohesion, said coating consisting essentially of 40 to 60 parts wax, 10 to 30 parts rubber, and 20 to 40 parts cyclo-rubber.

2. Sheet material having a thermo-adhesive coating which is resistant to cold flow, substantially free from tackiness and relatively elastic at normal temperatures and which becomes pressure sensitive at sealing temperatures of the order of 200–400° F. without substantial loss of cohesion, said coating consisting essentially of approximately 50 parts wax, 25 parts rubber, and 25 parts cyclo-rubber.

3. Sheet material having a thermo-adhesive coating which is resistant to cold flow, substantially free from tackiness and relatively elastic at normal temperatures and which becomes pressure sensitive at sealing temperatures of the order of 200–400° F. without substantial loss of cohesion, said coating consisting essentially of 40 to 60 parts paraffin wax having a melting point of the order of 140° F., 10 to 30 parts rubber, and 20 to 40 parts cyclo-rubber.

4. Sheet material having a thermo-adhesive coating which is resistant to cold flow, substantially free from tackiness and relatively elastic at normal temperatures and which becomes pressure sensitive at sealing temperatures of the order of 200–400° F. without substantial loss of cohesion, said coating consisting essentially of wax, rubber and cyclo-rubber, the wax being present in an amount at least as great as the rubber and cyclo-rubber.

5. Sheet material having a thermo-adhesive coating which is resistant to cold flow, substantially free from tackiness and relatively elastic at normal temperatures and which becomes pressure sensitive at sealing temperatures of the order of 200–400° F. without substantial loss of cohesion, said coating consisting essentially of approximately 80 parts paraffin wax having a melting point of the order of 140° F., approximately 40 parts rubber, and approximately 40 parts of cyclo-rubber derived from the reaction product formed from rubber in solution by treatment with chlorostannic acid or the halide of an amphoteric metal.

ERNEST L. KALLANDER.